United States Patent
Refai et al.

(10) Patent No.: US 12,465,326 B2
(45) Date of Patent: Nov. 11, 2025

(54) WEARABLE NON-INVASIVE LUNG FLUID MONITORING SYSTEM

(71) Applicant: Optecks, LLC, Tulsa, OK (US)

(72) Inventors: Hakki Refai, Bixby, OK (US); Badia Koudsi, Bixby, OK (US); Omar Yusef Kudsi, Chestnut Hill, MA (US)

(73) Assignee: Optecks, LLC, Bixby, OK (US)

( * ) Notice: Subject to any disclaimer, the term of this patent is extended or adjusted under 35 U.S.C. 154(b) by 93 days.

(21) Appl. No.: 17/188,685

(22) Filed: Mar. 1, 2021

(65) Prior Publication Data

US 2021/0282744 A1 Sep. 16, 2021

Related U.S. Application Data

(60) Provisional application No. 62/982,896, filed on Feb. 28, 2020.

(51) Int. Cl.
*A61B 8/08* (2006.01)
*A61B 8/00* (2006.01)

(52) U.S. Cl.
CPC .......... *A61B 8/4236* (2013.01); *A61B 8/08* (2013.01); *A61B 8/4488* (2013.01); *A61B 8/54* (2013.01); *A61B 8/56* (2013.01); *A61B 8/565* (2013.01)

(58) Field of Classification Search
CPC ....... A61B 8/4236; A61B 8/08; A61B 8/4488; A61B 8/54; A61B 8/56; A61B 8/565; A61B 8/085; A61B 8/4427; A61B 8/4472
See application file for complete search history.

(56) References Cited

U.S. PATENT DOCUMENTS

| | | | |
|---|---|---|---|
| 2006/0087199 A1* | 4/2006 | Larson, III | H10N 30/40 310/318 |
| 2010/0234716 A1* | 9/2010 | Engel | A61B 5/6833 600/459 |
| 2019/0129026 A1* | 5/2019 | Sumi | G01S 15/8915 |
| 2020/0367858 A1* | 11/2020 | Baldasarre | G01S 7/521 |

FOREIGN PATENT DOCUMENTS

| | | | |
|---|---|---|---|
| CN | 1147190 A | * 4/1997 | |
| EP | 1958569 A1 | * 8/2008 | ........... A61B 8/4236 |
| JP | 2006138667 A | * 6/2006 | |
| KR | 101465880 B1 | * 11/2014 | |

* cited by examiner

*Primary Examiner* — Joel Lamprecht

(74) *Attorney, Agent, or Firm* — DUNLAP CODDING, P.C.

(57) ABSTRACT

A wearable non-invasive lung fluid monitoring system has at least one processor in communication with a wearable sensor configured to be positioned on a chest of a patient. The wearable sensor includes at least one transducer configured to generate ultrasonic signal(s) probing internal space within the chest of the patient. The at least one processor is configured to determine at least one measurement estimate of fluid within the chest of the patient using acoustic impedance of the ultrasonic signal(s) and reflected wave(s) of the ultrasonic signal(s).

19 Claims, 6 Drawing Sheets

WEARABLE NON-INVASIVE LUNG FLUID MONITORING SYSTEM

CROSS REFERENCE TO RELATED APPLICATIONS/INCORPORATION BY REFERENCE STATEMENT

This application claims priority to U.S. Provisional Application No. 62/982,896, filed on Feb. 28, 2020, the disclosure of which is hereby incorporated by reference in its entirety.

STATEMENT REGARDING FEDERALLY SPONSORED RESEARCH OR DEVELOPMENT

Not Applicable.

BACKGROUND

Congestive heart failure, the leading cause of fluid accumulation in the lungs, represents the number one diagnosis for admission into US hospitals and the number one diagnosis for readmission to hospitals. Currently, there exists over 5.7 million heart failure patients in the U.S., with that number expected to increase to eight million by 2030. All sources of pleural effusion, fluid accumulating in the pleural space between the lung and chest wall, amount to one million new diagnoses in the US each year, and fifteen percent of people hospitalized with pleural effusion die within thirty days. In many cases, patients improve under proper treatment in the hospital and get released, only to become readmitted when limited or lack of monitoring causes their condition to worsen, or sudden onset of systems go unnoticed or unreported, requiring the readmission of the patient for treatment. In addition to patient health concerns, hospitalization and subsequent readmissions incur substantial costs. A recent study determined a mean per-patient cost of $14,631 per hospitalization event lasting on an average of five days. Given that 22.3% of patients were readmitted within thirty days, 33.3% within sixty days, and 40.2% within ninety days of initial hospitalization, the accumulated cost of the current treatment approach grew large rather quickly. The cycle of treatment, release, relapse and readmission shortens patient survival after diagnosis for any condition that causes fluid accumulation, and incurs significant cost to the patient and medical facilities.

Earlier detection of fluid accumulation in the lung, combined with more regular monitoring, represents the key to ensuring longer patient life spans and breaking of the readmission cycle. Regular data on the patient's condition allows the physicians caring for the patient to adjust and adapt treatment plans. Additionally, a remote capability system may allow physicians to be able to monitor and/or manage patients without incurring cost and risk to patients or medical personnel associated with traveling to a medical facility, particularly importantly during times such as the COVID-19 pandemic.

DETAILED DESCRIPTION

Figure 1A:
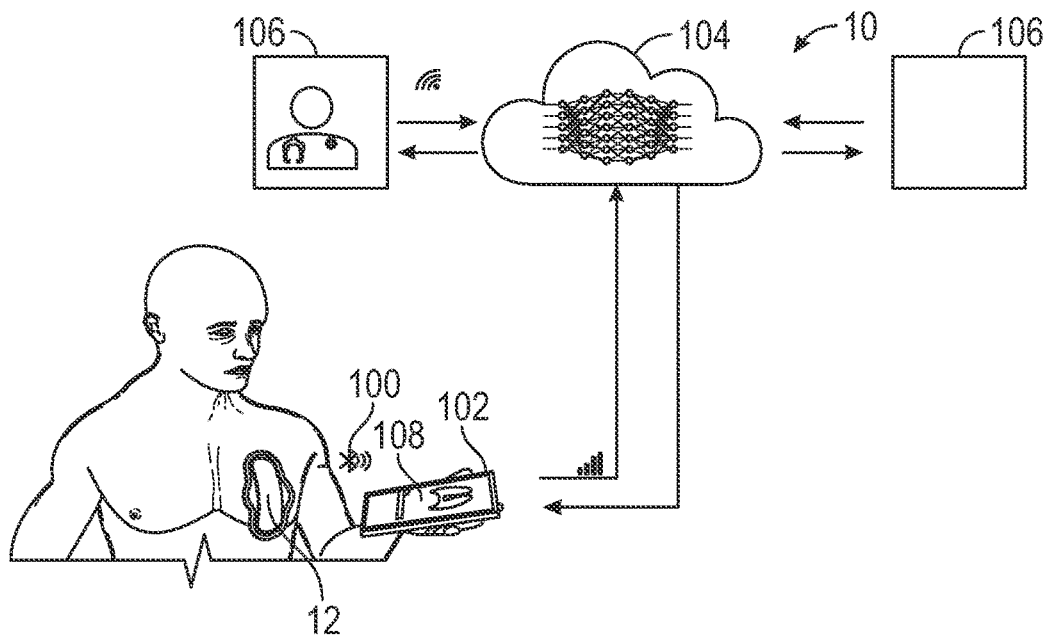
FIG. 1A illustrates a block diagram of an exemplary wearable non-invasive lung fluid monitoring system in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification.

All patents, published patent applications, and non-patent publications mentioned in the specification are indicative of the level of skill of those skilled in the art to which this presently disclosed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, assemblies, systems, kits, and/or methods disclosed herein can be made and executed without undue experimentation in light of the present disclosure. While the compositions, assemblies, systems, kits, and methods of the inventive concept(s) have been described in terms of particular embodiments, it will be apparent to those of skill in the art that variations may be applied to the compositions and/or methods and in the steps or in the sequence of steps of the methods described herein without departing from the concept, spirit, and scope of the inventive concept(s). All such similar substitutions and modifications apparent to those skilled in the art are deemed to be within the spirit, scope, and concept of the inventive concept(s) as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "associated with" and "coupled to" include both direct association/binding of two moieties to one another as well as indirect association/binding of two moieties to one another. Non-limiting examples of associations/couplings include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example.

The term "patient" as used herein includes human and veterinary subjects. "Mammal" for purposes of treatment refers to any animal classified as a mammal, including (but not limited to) humans, domestic and farm animals, nonhuman primates, and any other animal that has mammary tissue.

The term "treatment" refers to both therapeutic treatment and prophylactic or preventative measures. Those in need of treatment include, but are not limited to, individuals already having a particular condition/disease/infection as well as individuals who are at risk of acquiring a particular condition/disease/infection (e.g., those needing prophylactic/preventative measures). The term "treating" refers to administering an agent/element/method to a patient for therapeutic and/or prophylactic/preventative purposes.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Turning now to the drawings and in particular to FIG. 1, certain non-limiting embodiments thereof include a wearable non-invasive lung fluid monitoring system 10 configured to provide detection and/or measurement of pleural effusion and/or fluid levels within one or more lung. The system 10 may provide data on the progression of condition of a patient that a physician can use to manage medications and/or adjust treatment plans to maintain patient health and prolong life without frequent hospitalization. For example, the most common medicine used to treat fluid accumulation in the lung is a diuretic known commercially as Lasix. The proper dose of Lasix removes just enough water from the body to allow fluid to drain from the lung without endangering other organs due to dehydration. Too much Lasix, removing too much water from the body, causes kidney and organ failure, and too little Lasix results in only partial clearing of fluid from the lung. Complicating matters, the ideal dosage of Lasix needs continual adjustment as the disease condition progresses and increases the rate of fluid accumulation in the lung. The system 10 may detect and report sudden onset of fluid accumulation that indicates a rapid change in condition or complicating factors that require immediate attention.

In some embodiments, the wearable non-invasive lung fluid monitoring system 10 may include one or more wearable sensor 12 for monitoring and/or management of conditions of a patient. In some embodiments, the one or more wearable sensor 12 may be worn continuously by a patient. In some embodiments, the one or more wearable sensor 12 may be configured to integrate with one or more telemedicine platforms (e.g., telemedicine platforms currently known within the art). Generally, the wearable sensor 12 may include one or more transducers 16 (see FIG. 2A) configured to probe and/or record time-resolved amplitude scan of tissues within a chest cavity without inhibiting normal activity of a patient.

In some embodiments, the one or more wearable sensor 12 may be configured to transmit data via one or more wired or wireless interface 100 (e.g., Bluetooth, short range frequency). In some embodiments, the data may be received by one or more processors 102, wherein presence, location and/or volume of fluid within the one or more lung and/or chest cavity may be determined. Additional data may be provided to the one or more processors 102 including, but not limited to, an image of patient (e.g., ankles), pulse oximeter data, breathing rate, weight, diet, and/or the like.

The one or more processors 102 may work to execute processor executable code. The one or more processors 102 may be implemented as a single or plurality of processors working together, or independently, to execute the logic as described herein. Exemplary embodiments of the one or more processors 102 may include, but are not limited to, a digital signal processor (DSP), a central processing unit (CPU), a field programmable gate array (FPGA), a microprocessor, a multi-core processor, and/or combinations thereof, for example. In some embodiments, the one or more processors 102 may be incorporated into a smart device. The one or more processors 102 may be capable of communicating via the network 104 or a separate network (e.g., analog, digital, optical, and/or the like). In some embodiments, the one or more separate networks may include a cloud network (e.g., neural network, artificial intelligence). It is to be understood, that in certain embodiments, using more than one processor, the processors 102 may be located remotely from one another, in the same location, or comprising a unitary multi-core processor. In some embodiments, the one or more processors 102 may be partially or completely network-based or cloud-based, and may or may not be located in a single physical location. The one or more processors 102 may be capable of reading and/or executing processor executable code and/or capable of creating, manipulating, retrieving, altering, and/or storing data structure into one or more memories.

In some embodiments, the one or more processors 102 may transmit and/or receive data via a network 104 to and/or from one or more external systems 106 (e.g., one or more machine learning applications, artificial intelligence, external computer system, cloud based system(s)). For example, the one or more processors 102 may allow external systems 106 (e.g., physicians and/or medical personnel) access via the network 104 to the measurements (e.g., measurement predication) and data vectors of the patient. Access methods include, but are not limited to, cloud access and direct download from the one or more processors 102 via the network 104. Physicians and/or medical personnel may contact the patient by methods that include, but are not limited to, messages sent through the one or more processors, SMS, email, and phone conversations, to discuss measurement results and changes to the treatment plan, including but not limited to changes in medication dosages, patient physical activity, and patient diet.

Generally, the system 10 may be configured to measure and/or monitor fluid within a chest cavity of a patient. For example, the system 10 may be configured to measure and/or monitor fluid accumulation within one or more lung and/or pleural space. Measurement and/or monitoring of fluid may be configured to be provided on a near-continual or continual time period such that a patient may be remote from a physician's office and/or medical facility during measurement and/or monitoring. The system 10 may provide ease of use, accuracy, and/or functionality to enable continuous, near-continuous, remote and/or local monitoring of patients with medical conditions for which fluid accumulation in the chest cavity represents a key indicator of patient health. Such conditions include, but are not limited to, congestive heart failure (CHF), lung injury or damage, cancer, blockage of the lymph ducts, and pulmonary infections (e.g., COVID-19 and pneumonia). The system 10 may provide for a physician to monitor a patient on a near-continuous basis or continuous basis. Such monitoring may be in addition to or separate from scheduled visits to medical facilities (e.g., weekly, monthly or longer scheduled visits). In some embodiments, near-continuous or continuous monitoring may facilitate detection of gradual changes in medical conditions of the patient. In some embodiments, a physician may adjust medication and/or treatment plans based on near-continuous or continuous monitoring by the system 10. Allowing the condition to progress to an advanced state may require hospitalization, incur financial costs to the patient, reduce patient quality of life, and shorten the patient's lifespan. The near-continuous or continuous monitoring of the system 10 may also facilitate detection of sudden changes in medical condition of the patient that may require immediate attention by a physician or medical facility. Sudden changes can cause long-term reduction in health of the patient or death if not otherwise detected and/or treated in a timely manner. Breaking the traditional cycle of hospitalization for the initial diagnosis, release, relapse, and readmission may lead to reduced treatment and hospitalization costs, better quality of life, and a longer life beyond initial diagnosis.

Referring to FIGS. 1 and 2, the system 10 incudes one or more wearable sensor 12 configured to be positioned on a body of a patient. For example, the system 10 may include two or more wearable sensors 12 configured to be positioned on a body of a patient. In another example, the system 10 may include five or more wearable sensors 12 configured to be positioned on a body of a patient.

The one or more wearable sensor 12 may be formed in any shape, including, but not limited to, rectangular, square, circular, oval, or any fanciful shape. The one or more wearable sensor 12 may have a length L and a width w. In some embodiments, the length L and/or the width w may be in a range from 50 mm-150 mm. For example, the length L and/or the width w may be between 1 mm and 10 mm. Additionally, thickness of the wearable sensor 12 may be in a range from 3 mm-20 mm. For example, thickness of the wearable sensor 12 may be between 1.0 mm to 1.5 mm in some embodiments. Generally, length L, width w and thickness t may be configured for continuous wear by a patient while providing continual monitoring of fluid.

Figure 1B:
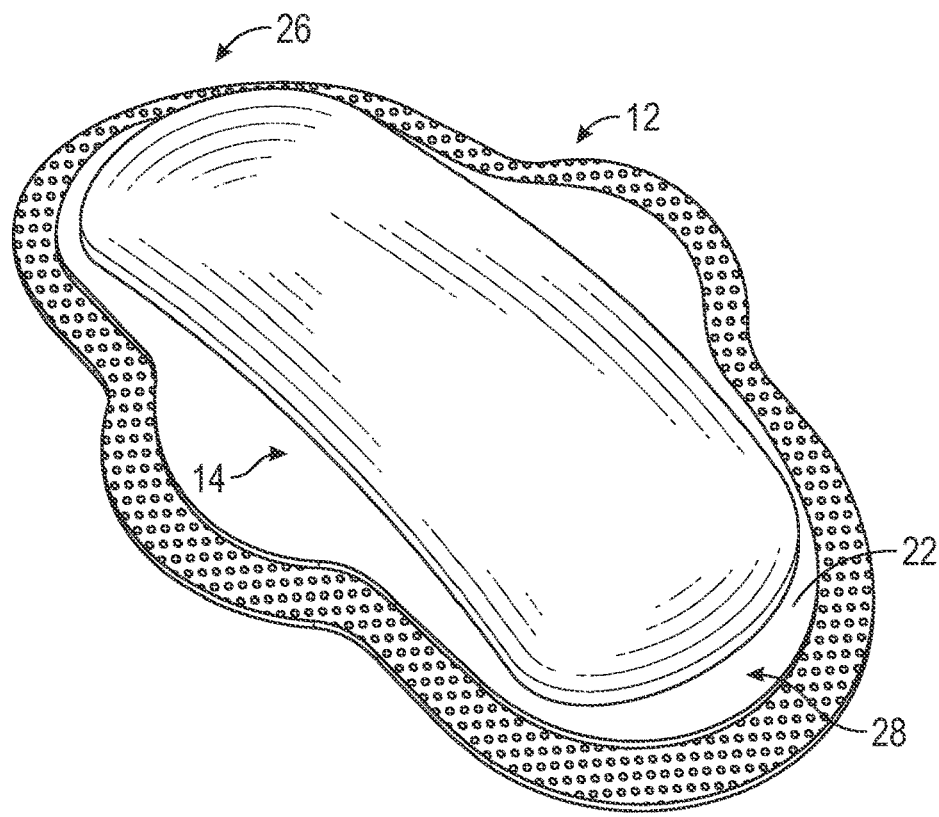
FIG. 1B illustrates a perspective view of an exemplary wearable sensor for use in the wearable non-invasive lung fluid monitoring system illustrated in FIG. 1A.
Figure 2A:
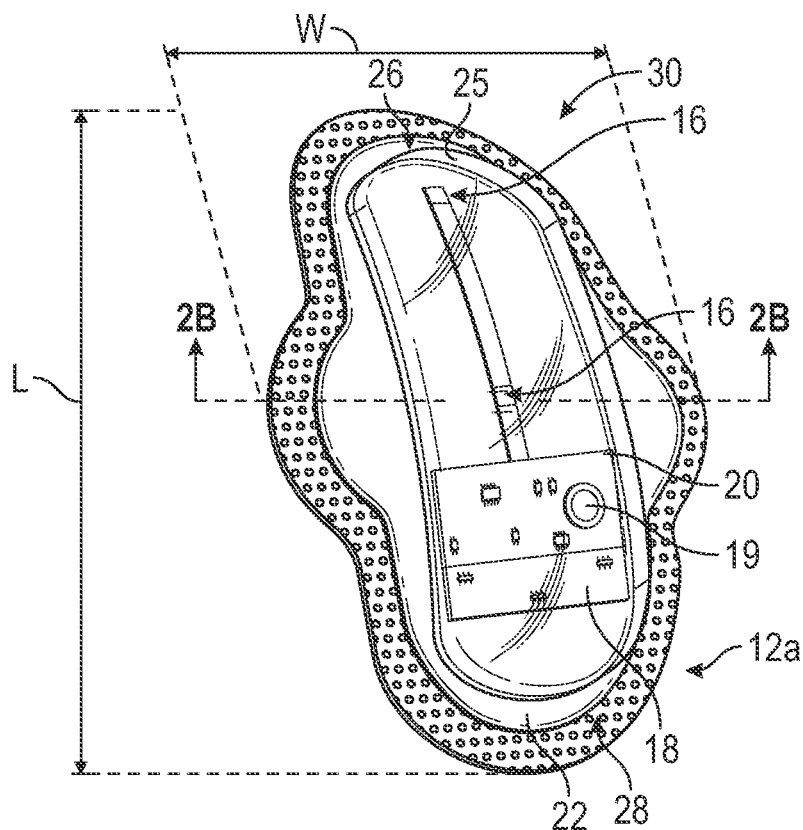
FIG. 2A illustrates a perspective view of the exemplary wearable sensor illustrated in FIG. 1B having the covering layer removed.

As shown in FIGS. 1B and 2A, the one or more wearable sensor 12 may include a pad member 14 supporting circuitry including but not limited to one or more transducers 16, one or more power systems 18, one or more antennas 19, and one or more control systems 20. The one or more transducers 16, one or more power systems 18, and one or more control systems 20 may be positioned on and/or attached to the pad member 14. Generally, the one or more wearable sensor 12 may be configured to generate, control and/or capture reflections of ultrasonic signals used to probe internal composition of a body of a patient (e.g., chest cavity). In some embodiments, the one or more transducer 16 may include flexible electronics and the one or more power system 18 may be a small form-factor battery. In some embodiments, the one or more control systems 20 may include flexible electronics.

The pad member 14 has a first side 22 and a second side 24 (see FIG. 2B) and may be formed of a soft material and/or a flexible solid. For example, the pad member 14 may be formed of a soft material, including, but not limited to, medical gauze, cotton, hydrogel, and/or the like. The pad member 14 may also be formed of a flexible solid including, but not limited to, silicone, soft rubber, and/or the like. In some embodiments, the one or more transducers 16 may make direct contact with the pad member 14. In some embodiments, the pad member 14 may include a low impedance acoustic material configured to maximize transmission of ultrasonic waves from the wearable sensor 12 to the chest cavity of the patient. In some embodiments, an acoustic gel may be positioned on at least a portion of the pad member 14 to maximize transmission of ultrasonic waves from the wearable sensor 12 to the chest cavity of the patient.

The pad member 14 may be configured to provide for one or more cavity 25 (see FIG. 2B) wherein the one or more transducers 16, one or more power system 18, one or more antenna 19 and one or more control systems 20 may be positioned. The one or more cavity 25 may be formed on the first side 22 of the pad member 14. The one or more transducers 16, the one or more power systems 18, one or more antennas 19, and the one or more control systems 20 may be positioned on the first side 22 of the pad member 14. In some embodiments, one or more transducers 16 may be directly attached to the epidermis of the patient via a gel. In some embodiments, the pad member 14 may be positioned about the one or more transducers 16 such that the one or more transducers 16 directly attach to the epidermis of the patient, while the pad member 14 supports and provides contact between the epidermis of the patient and one or more remaining components of the wearable sensor 12 (e.g., one or more power system 18, one or more antenna 19, one or more control systems).

The one or more antenna 19 may provide communication between the wearable sensor 12 and the one or more processor 102. In some embodiments, the one or more antenna 19 may be short range frequency antenna (e.g., Bluetooth, NSC) providing a wireless interface between the wearable sensor 12 and the one or more processors 102.

The pad member 14 may have a first end 26 and a second end 28. In some embodiments, the one or more transducers 16 may be positioned at a first location adjacent to the first end 26 of the pad member 14 and connected to or in communication with the control system 20. In some embodiments, the one or more transducers 16 may be in communication with the control system 20 via a flexible bus that may include, but is not limited to, traces printed on a flexible circuit board and a discrete wiring bus. The power system 18 may be positioned adjacent to the control system 20 to reduce loss of power (e.g., lengthy wires and the like). In some embodiments, the control system 20 may be positioned below the one or more transducers 16. In some embodiments, the power system 18 may be positioned below the control system 20. In some embodiments, the one or more transducers 16 may be positioned at the first location adjacent to the first end 26 of the pad member 14 and the control system 20 and/or power system 18 may be positioned at a second location adjacent to the second end 28 of the pad member 14.

The second side 24 of the pad member 14 may include one or more adhesive layers 27 (see FIG. 2B) configured to provide temporary positioning of the wearable sensor 12 on the body (e.g., epidermis) of the patient. The one or more adhesive layers 27 may provide for direct adhesion to the epidermis of the chest of the patient, for example. In some embodiments the one or more adhesive layers 27 may include an applicator, including but not limited to, a bandage or adhesive medical pad, affixed to the pad member 14. In some embodiments, the applicator can be replaced, allowing re-use of the wearable sensor 12 for more than one monitoring session. In some embodiments, the one or more adhesive layers 27 may include a low impedance acoustic material configured to maximize transmission of ultrasonic waves from the wearable sensor 12 to the chest cavity of the patient.

Figure 2B:
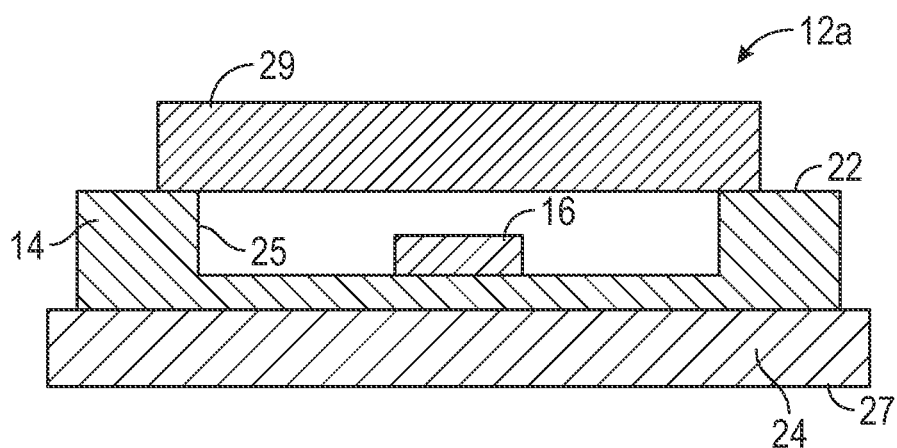
FIG. 2B illustrates a cut-away view of the exemplary wearable sensor illustrated in FIG. 2A taken along line A-A.

In some embodiments, the one or more wearable sensor 12 may additionally include one or more covering layers 29 configured to provide protection against moisture, water, or other environmental factors. The one or more covering layers 29 may be positioned at the first side 22 and/or the second side 24 of the pad member 14 as shown in FIG. 2B, and at least partially cover the cavity 25. The one or more covering layers 29 may be formed of flexible and/or soft material configured to prevent contamination of components within the cavity 25 by external materials including, but not limited to, conductive fluids such as water that may cause the system 10 to fail.

The control system 20 may provide power to the one or more transducers 16, provide drive voltages for the one or more transducers 16 to generate the ultrasonic waves, collect the electrical signals generated by the one or more transducers 16 from the reflected waves, and/or transmit data from the wearable sensor 12. The control system 20 may include one or more elements configured to (1) deliver voltages with the correct amplitude and timing to produce an ultrasonic wave of a pre-determined frequency and amplitude at the pre-determined time, (2) place individual or groups of transducers 16 in transmitting or receiving mode, (3) collect electrical signals generated by the transducers 16 in response to the reflected ultrasonic wave, (4) perform signal processing that includes, but is not limited to, filtering, amplification, and synchronization, and/or (5) execute the activation sequences of the transducer 16 for one or more of the operating modes described above. The control system 20 may include, but is not limited to, a microprocessor with sufficient memory, clock speed, and input/output (I/O) ports to implement one or more operating modes, and analog-to-digital converters (ADCs) to convert the analog A-scans into digital format for transmission and processing. In some embodiments, the control system 20 may include and/or support a Bluetooth transmitter for sending data from the wearable sensor 12 to a smart-device-based App being executed by the processor 102. Elements of the control system 20 may be configured to minimize total power consumed during operation of the one or more transducer 16 to increase the battery life and/or useful operating life of the wearable sensor 12.

In some embodiments, the control system 20 may be fabricated on a flexible substrate using one of the commercially available technologies for producing such circuits. The use of a flexible substrate may be configured to aid the wearable sensor 12 to conform to a shape of the patient. Such conformation may provide comfort to the patient and/or ensure contact with the epidermis of the patient. In some embodiments, the control system 20 may have a thickness in a range between 1 mm and 6 mm. For example, the control system 20 may have a thickness less than 1.6 mm. In some embodiments, the one or more transducers 16 may have a thickness in a range between 0.5 mm and 5 mm. For example, the one or more transducers 16 may have a thickness less than 1.6 mm. In some embodiments, the combination of the control system 20 and the one or more transducers 16 may have a thickness in a range between 1 mm and 5 mm. For example, the combination of the control system 20 and the one or more transducers 16 may have a thickness less than 1.6 mm.

The power system 18 may provide electrical power for the control system 20 and the one or more transducers 16. In some embodiments, the power system 18 may be a low-form factor battery (e.g., lithium battery, solid state battery). In some embodiments, the power system may extend less than 20 mm on any one side and have a thickness of less than 1.6 mm. In some embodiments, the power system 18 may have a power density configured to power the control system 20 and the one or more transducers 16 for a period of no less than two weeks. In some embodiments, level of heat of the power system 18 may be controlled such that the power system 18 does not generate a level of heat deemed uncomfortable or harmful to the patient.

Generally, the one or more transducers 16 may be configured to probe a body of a patient and collect reflected signal data. The transducers 16 may transmit one or more brief pulses of ultrasound into the body of the patient (e.g., chest cavity of the patient). Echoes of the pulse of ultrasound may be recorded. Such echoes may be reflected from one or more lung and/or from boundaries between materials of different acoustic impedance, for example. In some embodiments, the one or more wearable sensor 12 may probe at a pre-determined interval while the wearable sensor is being worn continuously. The pre-determined interval may be configured to probe the body of the patient while eliminating risk of heating of tissue of the patient. For example, the pre-determined interval may be about 30 minutes to 60 minutes.

The one or more transducers 16 may record echoes of the one or more pulses reflected from the body (e.g., lung) and from boundaries between materials of different acoustic impedance. The strength and timing of the reflection of the one or more pulses may vary depending on the location and volume of fluid within the body (e.g., chest cavity). For example, accumulating fluid may fill the lower part of a lung or chest cavity first. As the fluid accumulates, one or more transducers 16 positioned at a first position low on the chest of the patient may receive reflections from pleural effusions and/or fluid-filled lung tissue. One or more transducers 16 positioned at a second position located higher on the chest than the first position may receive reflections from partial effusion or tissue that does not contain extra fluid (for example a normal lung containing only air-filled tissue). For acoustic pulses, the strength of the reflection from a boundary between two substances (tissue and air, or tissue and water) depends on the difference in acoustic impedance of the two substances. Acoustic impedance Z depends on the velocity (V) of sound waves in a material and the density ($\rho$) of the material according to Z=V×$\rho$. Equation (1) may provide determination of the percentage of energy reflected (R) at the boundary:

$$R = \left(\frac{Z_1 - Z_2}{Z_1 + Z_2}\right)^2 \times 100\% \tag{EQ. 1}$$

wherein $Z_1$ and $Z_2$ are the acoustic impedances of the first and second substances, respectively. Acoustic impedances of substances in the thoracic cavity include: 0.00041 for air, 1.48 for water, 0.18 for lung tissue, 1.71 for muscles (heart), and 7.8 for bone.

Lung tissue and air have very different acoustic impedances, and thus a strong reflected signal (e.g., 100%) may occur. Lung tissue and water, or the boundary between the pleura and fluid, have more similar (though still different) acoustic impedances and thus a comparatively weaker reflected signal (e.g., 61%) may occur. Lung tissue, which contains many small pockets (such as alveolae), consists of a multitude of boundaries, producing a plethora of reflected waves when filled with air. Fluid-filled lung tissue produces fewer and less intense reflections. Fluid within the pleural space may not produce acoustic reflections. Therefore, a relatively long period of no reflections between the two pleural reflections can indicate the presence of fluid between the pleura (pleural effusion). Signals collected by the transducers 16 may therefore contain information on the presence, location and volume of fluid within the patient's chest cavity The transducers 16 may include, but are not limited to, capacitive micromachined ultrasonic transducers (CMUTs), piezoelectric micromachined ultrasonic transducers (PMUTs), and/or the like. Electronic driver circuits control the parameters of the ultrasonic pulses, including but not limited to, the duration, transmission frequency, amplitude, and timing of the pulses. The ultrasonic waves generated by the transducers 16 may have a frequency between 1.0 and 5.0 MHZ, (e.g., frequency range between 3-5 MHz). Determination of the frequency range may be configured to provide maximum penetration depth and/or resolving power for pleural effusions within the chest cavity, for example.

Figure 2C:
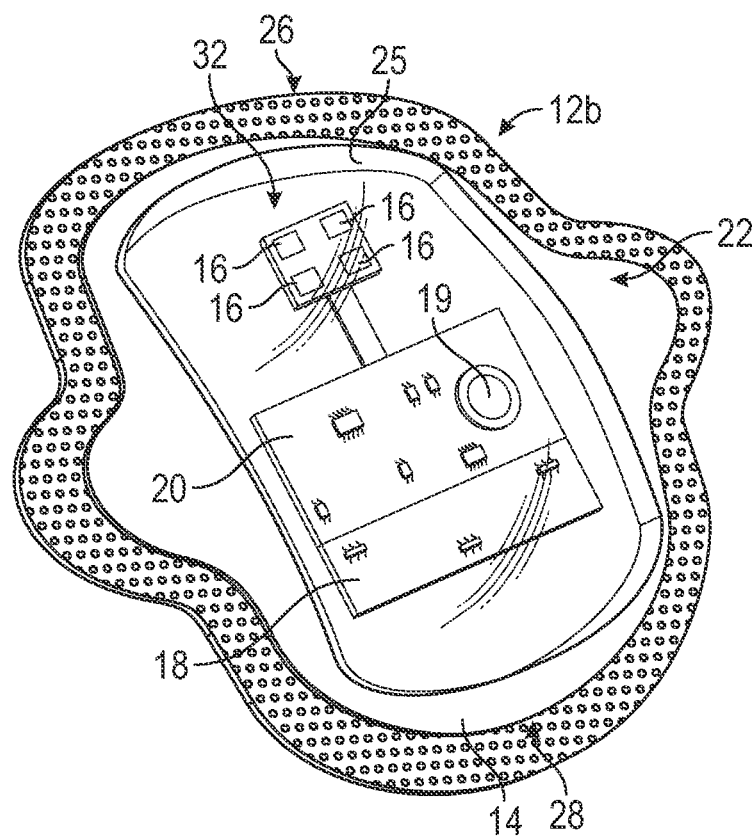
FIG. 2C illustrates a perspective view of another exemplary wearable sensor for use in the wearable non-invasive lung fluid monitoring system illustrated in FIG. 1.
Figure 3A:
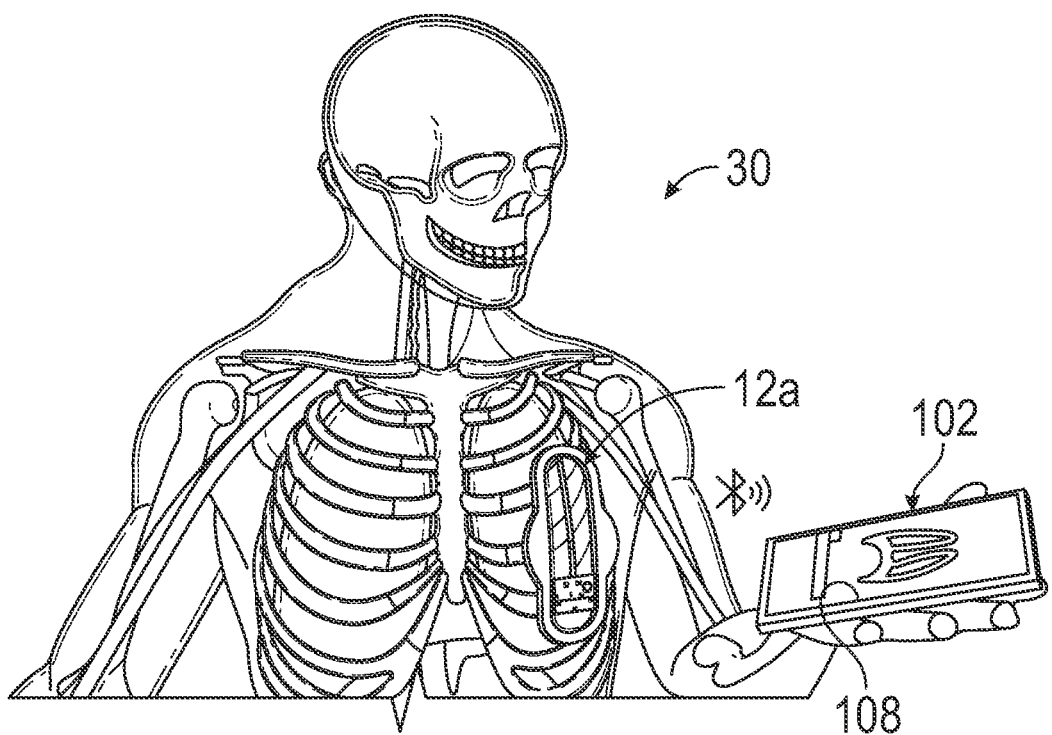
FIGS. 3A, 3B and 4 illustrate exemplary positioning of wearable sensors on a chest of a patient in accordance with the present disclosure.

Referring to FIGS. 2A-2C, the wearable sensors 12 may be configured as an array such as, for example, a linear array 30 as shown as the wearable sensor 12a in FIG. 2A or a two-dimensional array 32, as shown as the wearable sensor 12b in FIG. 2C. FIG. 2A illustrates an exemplary linear array 30 for use in the system 10. The wearable sensor 12a may include two or more transducers 16 positioned in the linear array 30 (e.g., a single vertical column) on a chest of a patient. The linear array 30 may extend from below lungs of the patient upward, for example. For example, as shown in FIG. 3A, the wearable sensor 12a may have the first transducer 16 in the linear array 30 positioned at or just below the position of the diaphragm of the patient after full inhalation such that the bottom of the chest cavity is within the field of view of the linear array 30. Additionally, in some embodiments, the first transducer 16 may be positioned below rib bones of the patient as bones may reflect ultrasonic waves preventing waves form reaching the chest cavity tissue beneath the ribs. Each remaining transducer 16 of the linear array 30 may be positioned at a predetermined distance(s) from the first transducer 16 extending toward the upper portion of the patient. The predetermined distance(s) may be configured to provide gaps of similar distance between each transducer 16 of the wearable sensor 12a. In some embodiments, the predetermined distance(s) may be configured to provide gaps of different distances between each transducer 16 of the wearable sensor 12a. In some embodiments, spacing of the two or more transducers 16 of the wearable sensor 12a may be such that the two or more transducers 16 may be positioned within gaps between ribs or other bone. For example, at least one transducer 16 may be positioned within the space between each pair of ribs of a patient. In another example, two or more transducers 16 may be positioned within the space between each pair of ribs of the patient. In another example, combinations of wearable sensors 12a having single transducers 16 and multiple transducers 16 may be positioned within the space between each pair of ribs of the patient. The number of transducers 16 positioned between ribs may be configured based on size of the transducer 16, size of the wearable sensor 12a, available distance between each pair of ribs, and/or the like. Although the single wearable sensor 12a is illustrated in FIG. 3A, any number of wearable sensors 12a and/or wearable sensors 12b may be used in accordance with the present disclosure.

Figure 3B:
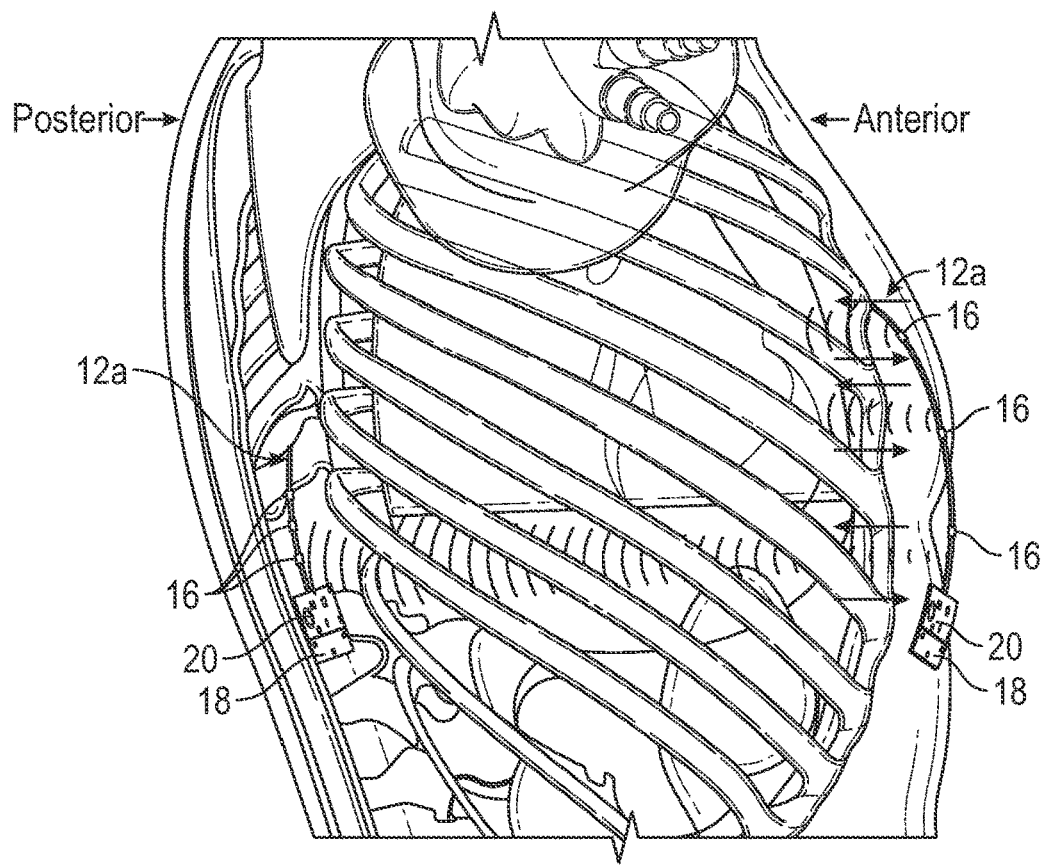

Within the linear array 30, the control system 20 may drive the one or more transducer 16 of each wearable sensor 12a to produce pulses of ultrasonic waves. In one example, operation of the linear array 30 may include, but is not limited to driving each transducer 16 to emit ultrasonic waves in sequence with remaining transducers 16 receiving reflected waves. For example, one or more transducers 16 of wearable sensor 12a may emit ultrasonic waves in sequence. The remaining transducers 16 of wearable sensors 12a may receive the reflected waves. Alternatively, one or more wearable sensor 12a may be positioned on the anterior and posterior of the patient as illustrated in FIG. 3B. Operation of the linear array 30 may include driving one or more transducer 16 positioned on the anterior or posterior to emit ultrasonic waves with the receiving transducers 16 positioned on the opposing anterior or posterior side of the patient.

In another example, operation of the linear array 30 may include a process wherein all transducers 16 produce ultrasonic waves (e.g., all transducers 16 of wearable sensor 12a), with the emission phase of each transducer 16, or a time delay with the emissions of other transducers 16, produce a narrow beam of ultrasonic waves configured to be steered through a vertical transmission angle by changing the phase/time delays between transducers 16. The one or more transducers 16 may then capture signals as amplitude scans (A-scans) consisting of the amplitude of the reflected wave as a function of time. In some embodiments, the A-scans for each ultrasonic pulse sequence may be collectively captured and transmitted (e.g., as a single data stream).

Figure 4:
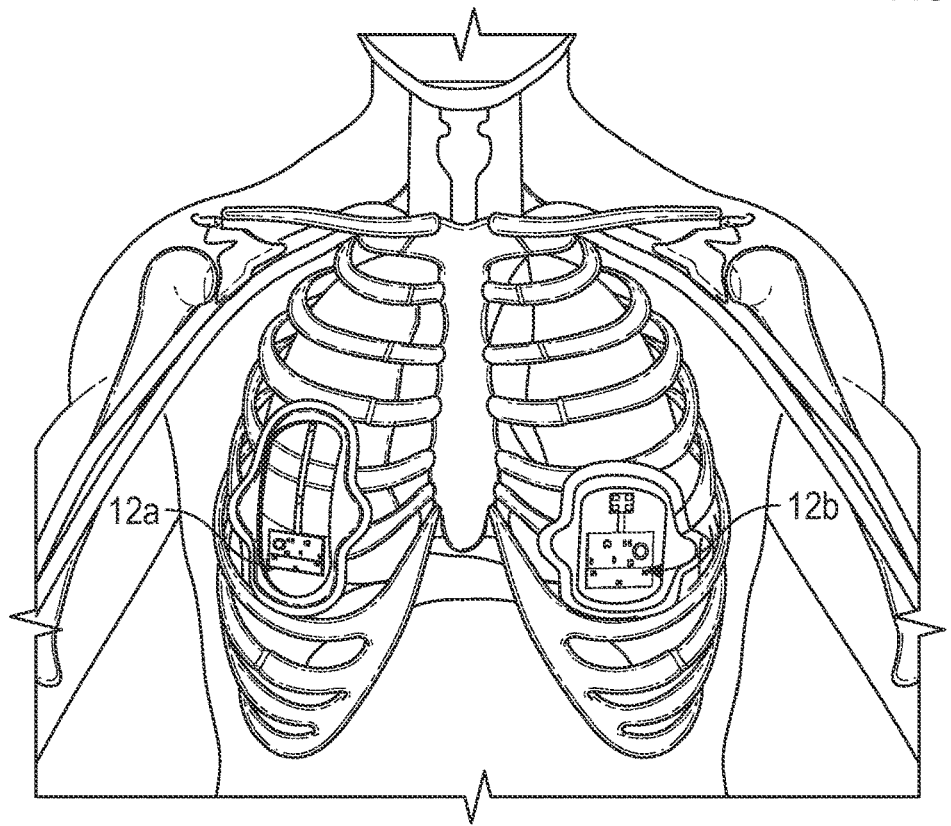

FIGS. 2C and 4 illustrate exemplary the wearable sensor 12b having the two-dimensional array 32 for use in the system 10. Generally, the transducers 16 of the wearable sensor 12b may be positioned in an N×M two-dimensional array on the chest of the patient. For example, the two-dimensional array 32 may include two or more vertical columns M of transducers 16 with two or more transducers 16 per column M. In some embodiments, the lowest row $N_x$ of the array may be positioned at or below one or more lung of the patient. For example, the lowest row $N_x$ may be positioned at or just below the diaphragm of the patient after full inhalation such that the transducers 16 of the wearable sensors 12b may be within the field of view of the chest cavity. Additionally, the lowest row $N_x$ may be positioned below or in-between ribs bones with each of the remaining transducers 16 in each column M of the two-dimensional array 32 positioned at a distance above the lowest transducer 16 at different vertical distances. Exact vertical placement of other transducers 16 in each column of the two-dimensional array 32 may be determined by the location and size of the ribs of the patient at the position occupied by the column. Each column M of the two-dimensional array 32 may extend up the chest of the patient. Vertical spacing of the transducers 16 may be such that the transducers 16 may be positioned within gaps between bones (e.g., gaps between ribs). Columns M in different lateral (i.e., side-to-side) positions on the chest of the patient chest may or may not have different spacing between transducers 16 within the columns M. The spacing used may depend on the interrogation mode—individual pulsed or phased-array—utilized within the array 32. For example, regular interval spacing may be used for a phased-array operation. Possible placements include, but are not limited to, constant interval spacing between all transducers 16, single transducer 16 positioned within the space between each pair of ribs, two or more transducers 16 positioned within the space between each pair of ribs, and combinations of single and multiple transducers 16 positioned within the space between ribs. Although FIG. 4 illustrates the wearable sensor 12a and the wearable sensor 12b, any number of wearable sensors 12a and/or wearable sensor 12b may be provided in accordance with the present disclosure.

The one or more power system 18 may be configured to drive the one or more transducers 16 to produce pulses of ultrasonic waves. Operation of the two-dimensional array 32 may include single transducers 16 transmitting in a first sequence operation, two or more transducers 16 transmitting in a second sequence operation, or a phased-array operation.

In the first sequence operation, individual transducers 16 may emit ultrasonic waves in sequence while additional transducers 16 record reflected waves. In the first sequence operation, one transducer 16 may produce a pulse of ultrasonic waves and direct the pulse into the chest cavity of the patient. All other transducers 16 may operate in listening mode, waiting to capture reflections of the pulse from structures and boundaries within the chest cavity. The system 10 may wait a predetermined amount of time to ensure that all relevant reflections are recorded. After the predetermined time, one of the other transducers 16 within the two-dimensional array 32 may produce a pulse of ultrasonic waves and direct the pulse into the patient's chest cavity while all other transducers 16 operate in listening mode. The process is repeated for every transducer 16 contained within the two-dimensional array 32. The transducers 16 can be activated to produce a pulse in any order, provided that all transducers 16 within the two-dimensional array 32 produce a pulse before any transducer 16 produces a second pulse.

In the second sequence operation, entire columns M of transducers 16 of the wearable sensor 12b may emit ultrasonic waves in sequence) while other columns M of transducers record reflected waves. Alternatively, the second sequence operation may include driving entire rows N of transducers 16 to emit ultrasonic waves in sequence while other rows N of transducer 16 record reflected waves. In the second sequence operation, two or more transduces 16 within the two-dimensional array 32 may produce a pulse of ultrasonic waves. The transducers 16 may produce the pulses simultaneously or produce the pulses at different times, with all times allowing each pulse to overlap in time with at least one other of the produced pulses. All other transducers 16 may operate in listening mode, waiting to capture reflections of the pulse from structures and boundaries within the chest cavity. The system 10 may wait a predetermined amount of time to ensure that all relevant reflections are recorded. After the predetermined time, another set of two or more transducers 16 within the two-dimensional array 32 may produce a pulse of ultrasonic waves and direct the pulse into the chest cavity of the patient while all other transducers 16 operate in listening mode. The new set of transducers 16 may be disjoint or partially overlapping with the previous set of transducers 16. The process may be repeated through two or more sets of transducers 16 within the two-dimensional array 32. The sets of transducers 16 can be activated to produce pulses in any order, provided that all sets within the two-dimensional array 32 produce a pulse before any one transducer 16 produces a second pulse.

In the phased-array operation, all transducers 16 of the wearable sensors 12b produce ultrasonic waves with each emission phase of the transducer 16 or time-delayed with the emissions of other transducers 16 producing a narrow beam of ultrasonic waves that can be steered through both vertical and horizontal transmission angles by changing the phase/time delays between transducers 16. In the phased-array operation, two or more columns of transducers 16 and/or wearable sensors 12 or two or more rows of transducers 16 and/or wearable sensors 12 within the two-dimensional array 32 may simultaneously transmit pulses of ultrasonic waves into the chest cavity of the patient. Each transducer 16 may be driven with a signal that has a fixed phase difference from the signals driving other transducers 16 within the two-dimensional array 32. The fixed phase difference between pulses transmitted by different transducers 16 creates a beam of ultrasonic energy that exits the two-dimensional array 32 at a specific angle. Different values of the phase difference produce different angles of the ultrasonic beam. The width and directivity of the beam depend on the number of rows N and/or columns M transmitting simultaneously. The phase difference is varied with time to sweep the direction of the beam through a range of angles within the chest cavity. The sweeping of phase difference can include, but is not limited to, continuous and discrete phase variations with time. In some embodiments, two or three rows N within a two-dimensional array may steer the ultrasonic beam through a range of vertical angles, allowing the two-dimensional array 32 to interrogate tissues lying behind the rib bones. Operating sequences include, but are not limited to, groups of two or more rows N or columns M transmitting in sequence while all other transducers 16 listen/receive and more than one group of two or more rows N or columns M transmitting simultaneously (for example, the top two rows N and the bottom two rows N) while other transducers 16 listen/receive. Operating multiple sets of rows N and/or columns M in phased-array mode may reduce the time required to complete an interrogation sequence. The phased-array operation may provide additional ability to interrogate tissues located behind rib bones and/or to evaluate the lateral extent of fluid in both the pleural space and the lung. The one or more transducers 16 may receive signals as amplitude scans (A-scans) consisting of the amplitude of the reflected wave as a function of time. In some embodiments, A-scans for each ultrasonic pulse sequence may be collectively captured and transmitted (e.g., via a single data stream).

In some embodiments, the one or more wearable sensor 12 may include one or more additional sensors communicating with the control system 20. Exemplary sensors include, but not limited to temperature sensors, moisture sensors, chemical sensors, biologic sensors, and/or the like. The control system 20 may include computer executable instructions to read the temperature sensor, compare the reading from the temperature sensor with one or more set points and then control the one or more transducer 16. For example, the control system 20 may reduce power supplied to the one or more transducer 16 when the temperature from the temperature sensor exceeds a set point to prevent overheating of the patient. In some embodiments, the control system 20 may increase power supplied to the one or more transducer 16 when the temperature from the temperature sensor is below the set point. In some embodiments, one or more gel or gel-like substances may be positioned between the one or more wearable sensor 12 and epidermis of a patient. The gel or gel-like substance may be configured to provide optimal transmission of ultrasonic waves between the one or more wearable sensor 12 and the body of the patient.

The one or more processor 102 may utilize software to perform one or more operations in accordance with the present disclosure. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based.

The one or more processor 102 may perform a data processing and analysis process, a secondary indicator collection and correlation process and/or a calibration process.

Generally, the data processing and analysis process provides a model extracting information on the presence or absence of fluid in the lung and, if fluid exists, the location of the fluid (lung or pleural space) and/or the level to which the fluid has accumulated. Generally, the data processing and analysis process collects A-scan data from the one or more wearable sensor 12 via the wired or wireless interface 100 and extracts measurements of the fluid content within the chest cavity of the patient, including but not limited to the presence, location, and volume of the fluid. The data processing and analysis software includes, but is not limited to, mathematical models relating A-scan parameters to fluid measurements and a machine learning algorithm trained to relate A-scan features to fluid measurements.

The mathematical model of the data processing and analysis process may implement sets of predictive mathematical equations that use the key features of the A-scan data and knowledge of the geometrical arrangement of the transducers 16 as inputs and provide the fluid measurements as outputs. Input features from the A-scans include, but are not limited to, (1) amplitude of voltage spikes, indicating strength of the reflection from an object or boundary within the chest cavity; (2) time delay between transmission of the ultrasonic pulse by the first transducer 16 and collection of the reflection by the second transducer 16, which encodes the distance into the chest cavity of the reflecting object or boundary; and, (3) the period or time spacing between repeated spikes, that can represent repeated reflections between two surfaces, such as the chest wall and the pleura. Inputs based on the geometrical arrangement of the transducers 16 include, but are not limited to, distance between transducers 16 and number of transducers 16. Output fluid measurements include, but are not limited to, the presence, location, and volume of the fluid. Examples of predictive mathematical models include, but are not limited to, a Deep Neural Network (DNN).

The machine learning algorithm may utilize a set of training data to construct correlations between the A-scan data and fluid measurements that allow the algorithm to accurately generate fluid measurements on new input data after conclusion of the initial training. Methods for collecting the training data include, but are not limited to, physician assisted measurement of actual fluid presence, location, and volume in the patient's lung prior to, during, and after initial treatment with an appropriate medication such as Lasix, and concurrent collection of A-scans from the wearable sensor patch at the time of each measurement and/or A-scans generated from a large multitude of patients representing a large multitude of body types and ranges of progression of conditions that result in the accumulation of fluid in the chest cavity. For the A-scan set, additional data associated with the A-scans may include, but not be limited to, size, weight, and fat content of the patient and fluid measurements from the multitude of patients.

The machine learning algorithm may be provided with the set of input parameters and the expected output measurements for each set of input parameters. The machine learning algorithm may progress through a cycle of training that allows the algorithm to provide more accurately estimate the presence, location, and volume of fluid. A larger and more comprehensive training data set may improve estimation accuracy of the machine learning algorithm.

Figure 5:
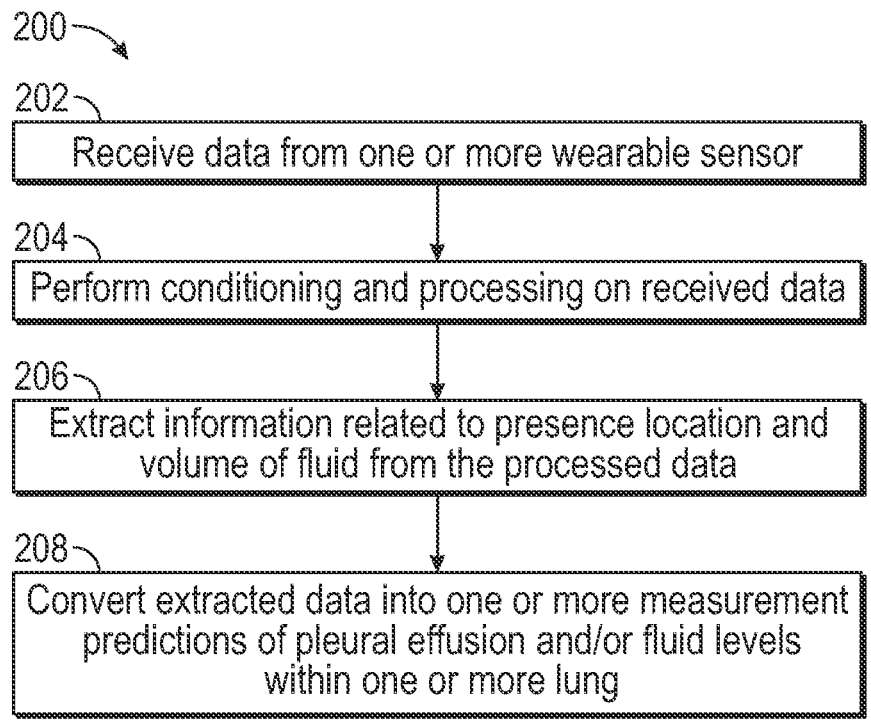
FIG. 5 illustrates a flow chart of an exemplary method for providing detection and/or measurement of pleural effusion and/or fluid levels within one or more lung of a patient.

FIG. 5 illustrates a flow chart 200 of an exemplary method for providing detection and/or measurement of pleural effusion and/or fluid levels within one or more lung. In a step 202, the one or more processors 102 (e.g., smart device) receive data from the one or more wearable sensors 12 via the wired or wireless interface 100 (e.g., Bluetooth). Retrieved data includes, but is not limited to, A-scans, transducer(s) 16 associated with each A-scan, and operating mode (single transducers 16 transmitting in sequence, multiple transducers 16 transmitting in sequence, phased-array). In some embodiments, the one or more processors 102 may also obtain information about the one or more wearable sensor 12, including but not limited to, the number and positioning of the transducers 16 within the wearable sensor 12, through methods that include, but are not limited to, accessing stored values in memory and training processes for machine learning algorithms. In a step 204, the one or more processors 102 may perform conditioning and processing on the data (e.g., A-scan data). The conditioning and processing may include, but are not limited to, noise filtering, other filtering for improving signal-to-noise ratio, and thresholding. In a step 206, the one or more processors 102 extracts information from the processed data including, but not limited to, the presence, location and volume of fluid within the patient's chest cavity. In a step 208, the one or more processors 102 may convert the extracted information into data into at least one measurement estimate of pleural effusion and/or fluid levels within one or more lung. The at least one measurement estimate may be provided in one or more formats, including but not limited to numbers, pictures, and word descriptions, useful to a physician or medical professional for assessing the progression of the condition causing fluid accumulation. In some embodiments, a measurement display component may present the formatted data to the patient in a manner that is easily related (e.g., sharable) to a physician or medical professional, including but not limited to the use of colors, choice of fonts, pictures with clear markers, and graphs of parameters over time.

The one or more processors 102 can receive input from the training set and/or the cloud-based machine learning algorithm, including but not limited to new constants, functions, and weights, that allow the analysis component to provide more accurate information for the at least one measurement estimate. The one or more processors 102 can transmit extracted data to the cloud-based machine learning algorithm to provide more training data sets for the purpose of further refinement of processing methods. The one or more processors 102 can provide remote access to the measurement data through methods that include, but are not limited to, transmitting the data over the network 104 (e.g., internet) to a designated physician, medical facility, or logging software and responding to remote requests for data from validated users.

Generally, the secondary indicator collection and correlation process may allow for the collection of secondary indicators through one or more additional sensors 110 and/or input provided by the patient through the interface 108 and/or external system 106, and establishes correlations between the indicators and the measurements from the data processing and analysis software. Secondary indicators of fluid accumulation may include, but are not limited to, weight, diet including salt intake, heart rate, oxygenation levels, and/or one or more photos (e.g. photos of ankles reveal swelling due to fluid accumulation in the feet). For example, external data may include records of patient weight (e.g., daily, weekly, monthly) indicating sudden increases and/or possible fluid accumulation. In another example, breathing rates measured by a microphone sensor, located separately or within the wearable sensor 12, can indicate the presence of fluid when the rate exceeds twenty breaths per minute. In another example, the one or more processor 102 can analyze external data such as photos of ankles obtained via a camera acquired by the patient to determine presence of ankle swelling. The patient can provide additional information, such as fluid and salt intake, if other data indicates possible fluid accumulation, and may also provide data on oxygen levels through use of an external pulse oximeter.

Additional sensors 110 may include, but are not limited to, one or more microphones for measuring breathing rate, pulse oximeters for measuring blood oxygenation, and/or the like. The secondary indicator collection and correlation process may collect data from the one or more additional sensors 110 through methods that include, but are not limited to, data entry by the patient via the interface 108, wireless connectivity (e.g., Bluetooth) with one or more sensor, wired connectivity with the sensor and/or combinations thereof. The interface 108 may implement data entry methods that include, but are not limited to, manual data entry by the patient, scanning or otherwise uploading diet logs and similar files, capture of images from a camera, voice recognition and/or combinations thereof. Correlation functions may include, but are not limited to, combining data and measurements into a numerical or mixed mode data vector and/or the attachment of secondary indicator data files to the measurement data file or folder.

In some embodiments, external data may be provided via the one or more external system 106. External data may be included within output measurements of the model to create a data vector or similar construct that more completely describes the state of health of the patient. In some embodiments, external data may represent secondary indicators that provide corroboration of fluid accumulation levels within the body of the patient.

Figure 6:
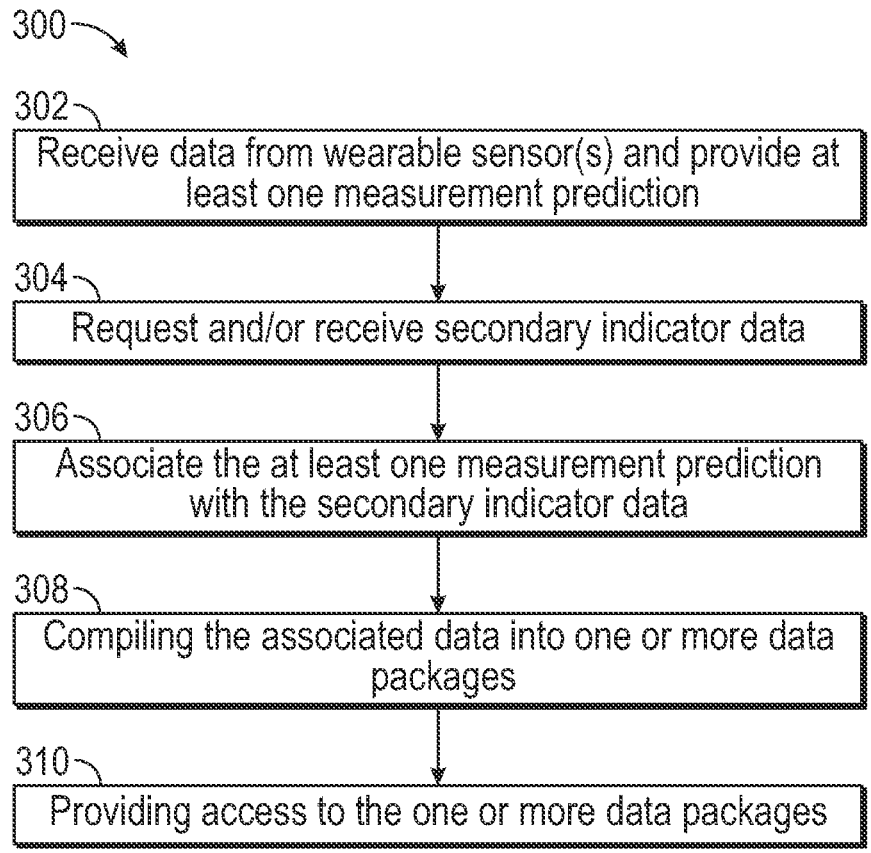
FIG. 6 illustrates a flow chart of an exemplary method of using secondary indicator collection and correlation in accordance with the present disclosure.

FIG. 6 illustrates a flow chart 300 of an exemplary method of using secondary indicator collection and correlation within the system 10. In a step 302, the one or more processors 102 receive data from the one or more wearable sensor 12 and provide at least one measurement estimate. Data may also include, but is not limited to, time stamps and operating mode. In a step 304, the one or more processors 102 may request and/or receive secondary indicator data. The secondary indicator data may be collected via the interface 108. For example, the one or more processors 102 may request and/or receive input from the patient giving secondary indicator data. In some embodiments, the input may be provided, using methods including, but not limited to, typing text and numbers, attaching or capturing a picture from the device camera, and uploading of files and data logs. In some embodiments, the one or more processors 102 may request the patient input files and data logs in specific formats, including but not limited to spreadsheets and formatted tables, to facilitate retrieval of data from the files. In a step 306, the one or more processors 102 may associate the at least one measurement estimate and the secondary indicator data through methods that include, but are not limited to, assigning labels and/or tags and the use of pointers. The association process may include, but is not limited to, the extraction, statistical analysis, and compression of data from input files and data logs and pictures. In a step 308, the associated data may be complied into one or more data package, the forms of which may include a multi-class data vector or matrix and a numerical data vector. In a step 310, the one or more processor 102 can provide remote access to the data package through methods that include, but are not limited to, transmitting the data package over the network 104 (e.g., internet) to a designated physician, medical facility or logging software and responding to remote requests for the data package from validated users.

Generally, the calibration process may facilitate and/or guide positioning of the one or more wearable sensor 12 on the chest of the patient. The one or more processor 102 may provide data and/or information by methods that include, but are not limited to, visual displays of data the patient can communicate to the attending physician, direct download of information from the processor 102 by the physician via the one or more external system 106, visual and aural alerts, network communication with a cloud-based machine-learning algorithm capable of providing updates to the data processing and analysis process, and/or the like. The patient may be guided through the calibration procedure via an interactive menu-driven manual, picture/icon-based instruction, and/or verbal instruction. The calibration process may include a step of a first calibration at a medical facility (i.e., medical facility calibration process), a step of a user positioning the one or more wearable sensors 12 on the chest (i.e., user calibration process), a step of updating calibration data for future use of the system 10 (i.e., calibration update process), and combinations thereof.

The medical facility calibration process of the wearable non-invasive lung fluid monitoring system 10 may occur at a medical facility (e.g., doctor office, hospital). A medical professional may identify the positioning of the one or more wearable sensors 12 via use of other instruments and/or measurement devices available within the medical facility and/or guided by standard medical practice and the knowledge of the medical professional. After positioning the wearable sensor 12 by the physician, the wearable non-invasive lung fluid monitoring system 10 may interrogate the chest cavity of the patient with ultrasonic waves, generate A-scan data from the one or more wearable sensor 12, and communicate the A-scan data to the one or more processors 102. The one or more processors 102 may store the collected data as the baseline or reference data for placement of the one or more wearable sensor 12. The first calibration process may also include, but is not limited to, the collection of A-scan data for the one or more wearable sensor 12 at one or more distances away from a first positioning in one or more directions, including but not limited to upward, downward, to the left and to the right. The medical professional may instruct the patient as to the appropriate region to place the one or more wearable sensor 12 for subsequent uses of the one or more wearable sensor 12.

The user may facilitate positioning of the one or more wearable sensors 12 via the user calibration process. The patient may place the one or more wearable sensor 12 within the one or more regions instructed by the medical professional. The patient may initiate the user calibration process via the one or more processors 102. The one or more processors 102 receive A-scan data from the one or more wearable sensor 12 and compare the collected data to the stored calibration data obtained during the first calibration process at the medical facility. Comparison methods include, but are not limited to, mean square error between the collected and calibration A-scans, including the A-scan data for movement away from the preferred positioning, if available, verifying detection of the diaphragm by the lowest transducer(s) in the transducer array, and the presence or absence of rib reflections in the collected A-scan data. The one or more processors 102 may determine and/or estimate error in positioning of the one or more wearable sensor 12 from the comparison results. If the comparison indicates an error in positioning, the one or more processors 102 may provide one or more indicators (e.g., audio, visual, hepatic) informing the patient of the error and provides instruction on how to improve the positioning of the wearable sensor patch. For example, the one or more processors 102 may inform the patient through methods that include, but are not limited to, pictograms indicating the target positioning and the current positioning of the one or more wearable sensor 12, verbal or written instructions (for example, move the one or more wearable sensor 12 two millimeters to the left), and/or a set of numbers indicating the positioning error in the vertical and horizontal directions. The process continues until the comparison indicates that the error in positioning is sufficiently small that to minimize errors in fluid measurements by the monitoring system 10.

The one or more processors 102 may update the baseline A-scan data used for making comparisons during the calibration update process. Updating may result from changes in patient health, including but not limited to progression of the condition that causes fluid to accumulate in the chest cavity. The one or more processors 102 may compare the results of no less than three calibration session to determine if the difference between the A-scan data from recent sessions and the current baseline data is repeatable and statistically significant. The one or more processors 102 may replace the current baseline data with data from the most recent calibration sessions if the software determines that the difference between the recent A-scan data and the current baseline data is indeed repeatable over two or more measurement sessions and statistically significant.

Figure 7:
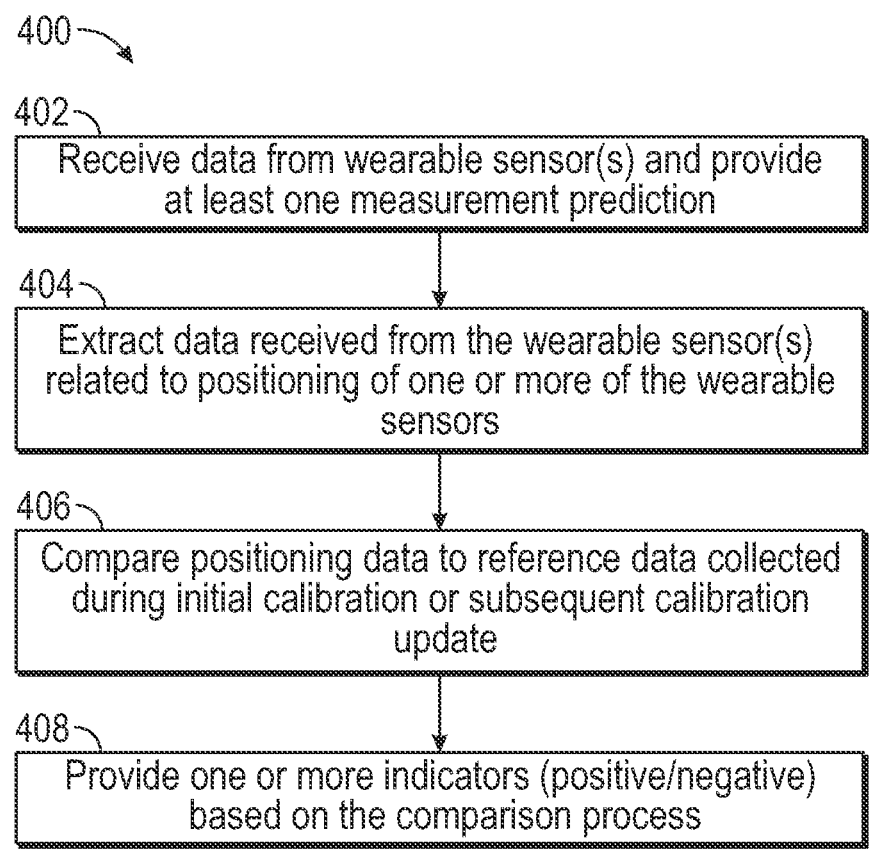
FIG. 7 illustrates a flow chart of an exemplary method of calibration a wearable non-invasive lung fluid monitoring system in accordance with the present disclosure.

FIG. 7 illustrates a flow chart 400 of an exemplary method of calibrating the system 10 after an initial calibration. In some embodiments, the calibration process may only be initiated by the user via the interface 108 of the one or more processors 102. In a step 402, the one or more processors 102 may receive data from the one or more wearable sensor 12 and provide at least one measurement estimate. In a step 404, the one or more processors 102 extract data received from the one or more wearable sensors 12 related to the positioning of the one or more wearable sensors 12, and may include, but is not limited to, the location, curvature and thickness of ribs, distances to the pleura and the lung, shape of the lung and combinations thereof. In a step 406, the one or more processors 102 may compare the positioning data to reference data collected during the initial calibration or subsequent calibration update. The comparison process evaluates accuracy using methods that include, but are not limited to, mean square error and absolute error. In a step 408, the one or more processors 102 may provide one or more indicators based on the comparison process. For example, if the comparison process reveals that the current position of one or more wearable sensor 12 is not correct, estimates of error in the direction (up, down, left or right) and the magnitude of the error may be determined by the one or more processors 102. In a step 408, the one or more processors 102 may provide one or more negative indicators (e.g., audio, visual, hepatic) informing the patient of the corrective action. In some embodiments, the one or more processors 102 may wait for an initiation signal from the patient to retrieve the next set of data from the one or more wearable sensor 12. If the comparison process reveals that the current position of the one or more wearable sensor 12 is correct, the one or more processors 102 may provide the patient one or more positive indicators (e.g., audio, visual, hepatic) that the calibration process is complete. In some embodiments, the one or more processors 102 may evaluate calibration history (e.g., using no less than the last five calibration procedures), to determine if an update of the reference data may be needed. Evaluation of calibration history may include statistical analysis, including but not limited to, long-term average and standard deviation of error between collected and reference data, to determine if the changes in patient condition have caused a permanent change in the data used to position the one or more wearable sensor 12 during calibration. If the statistical analysis finds a permanent change has occurred, the most recent calibration history may replace the existing reference data and becomes the new reference data for the next calibration procedure. If the statistical analysis does not find a permanent change has occurred, no action is taken.

In some embodiments, the one or more processors 102 may use the network 104 to upload measurements and/or data vectors to one or more cloud-based machine learning algorithm. In some embodiments, the one or more processors 102 may upload measurements and/or data vectors at least once a day. The cloud-based machine learning algorithm may include but is not limited to, supervised and unsupervised algorithms. The cloud-based machine learning algorithm may combine data uploaded from the one or more processors 102 with data uploaded from systems 10 of a plurality of patients to form one or more sets of training data. The cloud-based machine learning algorithm may collect and combine such data over a pre-determined time period (e.g., less than a week) prior to utilizing the data to perform training of the algorithm. The training may allow the algorithm to refine aspects of the data processing and analysis software, including, but not limited to, constants, weights, and functions, that may improve the accuracy of the measurement data produced by the software. The cloud-based machine learning algorithm downloads the refinements to the one or more processors 102 through the network 104.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A wearable non-invasive lung fluid monitoring system, comprising:
    a wearable sensor configured to be positioned on a chest of a patient, the wearable sensor comprising:
    a pad member constructed of a soft material or a flexible solid, the pad member having a first side and a second side, the first side forming at least a portion of a cavity extending from a first end of the pad member to a second end of the pad member, the second side including a low impedance acoustic material configured to maximize transmission of ultrasonic waves;
    at least one transducer positioned within the cavity, the at least one transducer configured to generate at least one ultrasonic signal probing internal space within the chest of the patient and receive at least one reflected wave of the at least one ultrasonic signal;
    at least one control system in electrical communication with the at least one transducer, and positioned adjacent to the at least one transducer, the at least one control system configured to drive voltages for the at least one transducers and receive data generated by the at least one transducer from the at least one reflected wave of the at least one ultrasonic signal;
    at least one battery in electrical communication with the at least one control system, the at least one battery configured to provide electrical power for the control system and the at least one transducer; and,
    an adhesive layer positioned on the second side of the pad member and configure to adhere to the chest of the patient; and,
    at least one processor configured to determine at least one measurement estimate of fluid within the chest of the patient using acoustic impedance of the at least one ultrasonic signal and the at least one reflected wave of the ultrasonic signal and provide at least one indicator based on the at least one measurement estimate.

2. The wearable non-invasive lung fluid monitoring system of claim 1, wherein the wearable sensor further comprises at least one covering layer extending from a first location adjacent to the first end of the pad member to a second location adjacent to the second end of the pad member and across at least a portion of the cavity.

3. The wearable non-invasive lung fluid monitoring system of claim 1, wherein the controller is configured to cause the at least one transducer to transmit a plurality of ultrasonic signals at pre-determined intervals.

4. The wearable non-invasive lung fluid monitoring system of claim 1, wherein the at least one transducer includes a plurality of transducers positioned in a vertical array in the cavity of the pad member.

5. The wearable non-invasive lung fluid monitoring system of claim 4, wherein the plurality of transducers are configured to be positioned on the chest of the patient such that each transducer is positioned between a different set of ribs of the patient.

6. The wearable non-invasive lung fluid monitoring system of claim 4, wherein the control system is configured to drive a first transducer of the plurality of transducers to emit the at least one ultrasonic signal with remaining transducers of the plurality of transducers of the wearable sensor receiving the reflected wave of the at least one ultrasonic signal.

7. The wearable non-invasive lung fluid monitoring system of claim 4, wherein the control system is configured to drive all transducers of the plurality of transducers to emit at least one ultrasonic pulse sequence of ultrasonic signals with emission phase of each transducer producing a narrow beam of ultrasonic waves configured to be steered through a vertical transmission angle by changing phase between transducers.

8. The wearable non-invasive lung fluid monitoring system of claim 7, wherein the transducers are configured to receive signals as amplitude scans consisting of amplitude of the reflected wave as a function of time.

9. The wearable non-invasive lung fluid monitoring system of claim 8, wherein the amplitude scans for each ultrasonic pulse sequence are collectively captured by the control system and configured for transmission as a single data stream.

10. The wearable non-invasive lung fluid monitoring system of claim 1, wherein the at least one transducer includes a plurality of transducers positioned in an N×M two-dimensional array having two or more vertical columns M and two or more rows N of transducers.

11. The wearable non-invasive lung fluid monitoring system of claim 10, wherein at least one row N of the N×M two-dimensional array is configured to be positioned below a diaphragm of the patient after full inhalation of the patient.

12. The wearable non-invasive lung fluid monitoring system r of claim 10, wherein at least one row N of the N×M two-dimensional array is configured to be positioned between ribs of the patient.

13. The wearable non-invasive lung fluid monitoring system of claim 10, wherein the control system is configured to drive a first transducer to emit the at least one ultrasonic signal with remaining transducers of N×M two-dimensional array receiving the reflected wave of the ultrasonic signal.

14. The wearable non-invasive lung fluid monitoring system of claim 10, wherein the control system is configured to drive at least one column M of transducers within the N×M two-dimensional array as remaining columns M of transducers receive reflected waves.

15. The wearable non-invasive lung fluid monitoring system of claim 10, wherein the control system is configured to drive at least one row N of transducers within the N×M two-dimensional array as remaining row N of transducers receive reflected waves.

16. The wearable non-invasive lung fluid monitoring system of claim 10, wherein the control system is configured to drive all transducers in the N×M two-dimensional array to produce ultrasonic signals with time-delayed emissions producing a narrow beam of ultrasonic waves configured to be steered via vertical and horizontal transmission angles by changing time delays between transducers.

17. The wearable non-invasive lung fluid monitoring system of claim 1, further comprising at least one external sensor configured to provide at least one secondary indicator of fluid accumulation.

18. A wearable non-invasive lung fluid monitoring system, comprising:
a wearable sensor configured to be positioned on a chest of a patient, the wearable sensor having:
a pad member constructed of a soft material or a flexible solid, the pad member having a first side and a second side, the second side of the pad member configured to adhere to the chest of the patient and the second side including a low impedance acoustic material configured to maximize transmission of ultrasonic waves;
a plurality of transducers positioned on the first side of the pad member, the plurality of transducers configured to generate at least one ultrasonic signal probing internal space within the chest of the patient and receive at least one reflected wave of the ultrasonic signal;
at least one control system positioned on the first side of the pad member, the control system configured to drive voltages for the plurality of transducers and receive data generated by at least one transducer of the plurality of transducers from the at least one reflected wave of the ultrasonic signal; and,
at least one non-transitory processor readable medium, operably coupled to at least one processor, the at least one non-transitory processor readable medium storing processor executable instructions, when executed by the processor, cause the processor to:
receive data generated by the at least one transducer from the at least one reflected wave of the ultrasonic signal;
extract fluid data including presence, location and volume of fluid within the chest of the patient using the data generated by the at least one transducer from the at least one reflected wave of the ultrasonic signal; and,
determine at least one measurement estimate based on the fluid data; and
provide at least one indicator based on the at least one measurement estimate.

19. The wearable non-invasive lung fluid monitoring system of claim 18, wherein the processor executable instructions further include instructions to cause the processor to receive secondary indicator data and determining at least one measurement estimate further includes determining the at least one measurement estimate based on the fluid data and the secondary indicator data.

* * * * *